United States Patent [19]

Gottesman et al.

[11] Patent Number: 5,036,546
[45] Date of Patent: Jul. 30, 1991

[54] PSEUDO-NOISE PRODUCT CODED APERTURE ARRAYS AND METHOD FOR DESIGNING SAME

[75] Inventors: Stephen R. Gottesman, Huntington; Edward J. Schneid, Commack, both of N.Y.

[73] Assignee: Grumman Aerospace Corporation, Bethpage, N.Y.

[21] Appl. No.: 320,769

[22] Filed: Mar. 8, 1989

Related U.S. Application Data

[63] Continuation-in-part of Ser. No. 916,000, Oct. 6, 1986, abandoned.

[51] Int. Cl.$^5$ .............................................. G06K 9/20
[52] U.S. Cl. .................................. 382/65; 382/26; 382/34; 382/42
[58] Field of Search .................... 250/363.06, 505.1; 350/162.13–162.15; 375/115, 116; 380/34; 364/717, 717.5, 728.01, 728.03, 728.05, 728.07; 382/26, 34, 42, 43, 65

[56] References Cited

U.S. PATENT DOCUMENTS

| | | |
|---|---|---|
| 3,599,147 | 8/1971 | Rogers et al. |
| 3,604,778 | 9/1971 | Burckhardt |
| 3,705,981 | 12/1972 | Harmuth |
| 3,748,470 | 7/1973 | Barrett |
| 4,013,338 | 3/1977 | Sato et al. |
| 4,037,918 | 7/1977 | Kato |
| 4,209,780 | 6/1980 | Fenimore et al. ............. 350/162.12 |
| 4,228,420 | 10/1980 | Fenimore et al. |
| 4,360,797 | 11/1982 | Fenimore et al. |
| 4,389,633 | 6/1983 | Fenimore ............................. 382/42 |

OTHER PUBLICATIONS

Gourlay, A. R. et al., "Geometric Coded Aperture Masks", Applied Optics, vol. 22, No. 24, Dec. 1983, 4042–4047.
M. Ranieri, "Coded aperture Telescopes for Hard X-Ray Astronomy", Journal of the British Interplanetary Soc., vol. 34, No. 4, pp. 135–138, 1981.
G. Indebetouw et al., "Scanning Optical Reconstruction of Coded Aperture Images" Appl. Phys. B27, No. 2, pp. 69–76, 1982.
Fenimore et al., "Coded Aperture Imaging with Uniformly Redundant Arrays", Applied Optics, vol. 17, No. 3, Feb. 1978, pp. 337–347.
E. E. Fenimore, "Coded Aperture Imaging: Predicted Performance of Uniformly Redundant Arrays", Applied Optics, vol. 17, No. 22, Nov. 1978, pp. 3562–3570.
F. Jessie MacWilliams et al, "Pseudo-Random Sequences and Arrays", Proc. of the IEEE, vol. 64, No. 12, pp. 1715–1729, 1975.
Martin Harwit et al., Hadamard Transform Optics, Academic Press 1979.

*Primary Examiner*—David K. Moore
*Assistant Examiner*—Jose L. Couso
*Attorney, Agent, or Firm*—Richard G. Geib; Daniel J. Tick

[57] ABSTRACT

A self-supporting coded aperture array, and method for designing same, including transparent and opaque elements, the elements of the array being defined as one of transparent and opaque in correspondence with an array pattern defined by the direct product of two pseudo-noise sequences. The new arrays (called PNP arrays, for Pseudo-Noise Product) are of self-supporting geometry, simplifying fabrication and making them ideal candidates for situations where active apertures are employed, as for example, in high-energy γ-ray imaging. A unique and important feature of all PNP arrays is the ability to produce reconstructed images with uniform noise regardless of the original source structure.

13 Claims, 5 Drawing Sheets

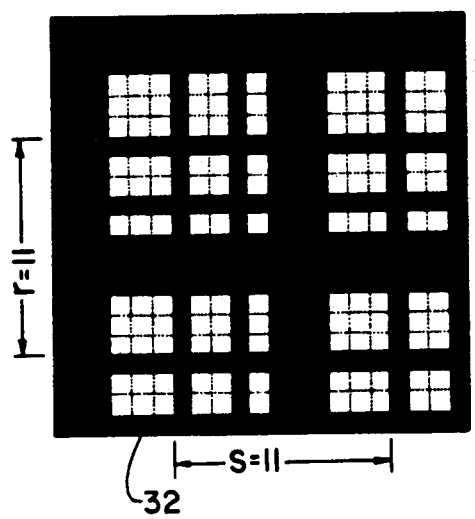
FIG.4
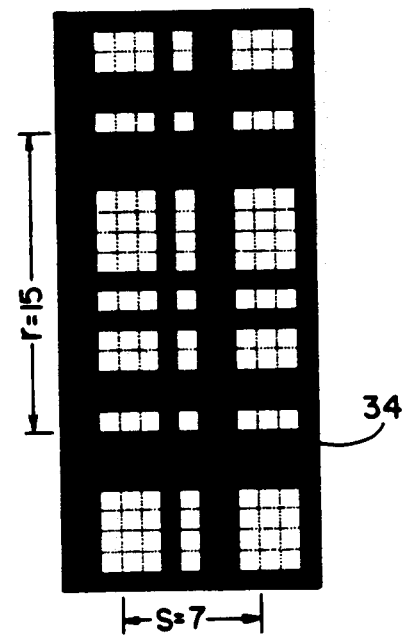
FIG.5
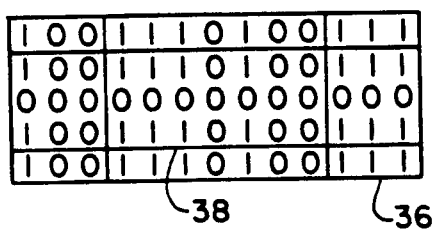
FIG.6
| 1 | 0 | -1 | 0 | 1 | 0 | -1 | 0 |
|---|---|---|---|---|---|---|---|
| 0 | 0 | 0 | 0 | 0 | 0 | 0 | 0 |
| -1 | 0 | 1 | 0 | -1 | 0 | 1 | 0 |
| 0 | 0 | 0 | 0 | 0 | 0 | 0 | 0 |
| 1 | 0 | 1 | 0 | 1 | 0 | -1 | 0 |
| 0 | 0 | 0 | 0 | 0 | 0 | 0 | 0 |
FIG.7 (PRIOR ART)

PSEUDO-NOISE PRODUCT CODED APERTURE ARRAYS AND METHOD FOR DESIGNING SAME

This is a Continuation-in-Part of application Ser. No. 916,000, filed Oct. 6, 1986 for Pseudo-Noise Product Coded Aperture Arrays and Method for Designing Same, now abandoned.

The present invention relates to coded aperture arrays, and more particularly, a class of coded aperture arrays known as self-supporting arrays. More particularly, it relates to coded aperture arrays which may be used for the imaging of X-ray, γ-ray (gamma-ray) and neutron sources.

Optical lens systems cannot be used to image X-ray, γ-ray or neutron sources as the radiation therefrom generally penetrates the system without substantial deflection. Sources of such high energy electromagnetic radiation are generally imaged by coded aperture arrays onto a detector which has detector elements arranged in a pattern of rows and columns.

Since first proposed as a means of imaging X-ray and γ-ray sources, coded apertures have become increasingly important in applications where the spacial location or distribution of X-ray or γ-ray emitters must be determined. Imaging techniques based on coded apertures are being successfully applied by the astrophysics and medical imaging professions. Coded aperture detectors have the advantage of a wide field of view and permit resolution of the structure of the source.

In coded aperture imaging, an aperture consisting of opaque and transparent regions is placed in front of a position-sensitive detector. Every point source within the detector's field of view casts a shadow of the aperture pattern onto the detector plane. Each shadow is displaced an amount commensurate with the angular displacement of the point source from the system's central axis. The sum total of the radiation pattern recorded by the detector constitutes the "coded" data which usually bears no resemblance to the actual source. The source distribution must be inferred from the coded data via a decoding algorithm that is a function of the aperture pattern. Ideally, the decoding algorithm should yield an undistorted image of the original source distribution and have high sensitivity (good signal-to-noise ratio).

As hereinbefore mentioned, the invention relates to a class of coded aperture arrays known as self-supporting arrays. Self-supporting aperture arrays are desirable due to their ability to resist relatively large mechanical forces generated by shock or vibration as may be encountered by an array launched from the earth, on a spacecraft, for astronomical observation. Further, self-supporting aperture arrays do not require the presence of support structures which, due to their location in the path of the incoming radiation, tend to degrade the quality of the image produced. As such, self-supporting aperture arrays are particularly desirable for imaging low energy γ rays, as there is no support structure present to absorb or scatter low energy radiation. In addition, the relatively continuous structure of self-supporting aperture arrays, if formed of a scintillation material, permits these arrays to act as active collimators to provide a "veto" output to prevent a photon which travels through an opaque region of the array and reaches the detector from being counted by instruments responsive to the detector. If the aperture array were formed of a large number of scintillation elements, not physically interconnected, a large number of photo detectors or an intricate network of light pipes would be required to detect the passage of photons. Cost, complexity and weight of the aperture array would be greatly increased, making it much less practical for most applications, including those on a spacecraft.

The principal object of the present invention is to provide a class of coded aperture arrays which may be constructed so as to be self-supporting.

An object of the invention is to provide a self-supporting coded aperture array whose reconstructed images possess noise terms which are insensitive to original source structure.

Another object of the invention is to provide a coded aperture array wherein the opaque areas are continuous so that the array may be easily used as an active aperture.

Still another object of the invention is to provide a coded aperture array having a continuous opaque edge about the entire perimeter thereof.

Yet another object of the invention is to provide a coded aperture array having desirable ideal imaging properties.

An object of the invention is to provide a coded aperture array having a decoding matrix with decoding coefficients which are all of unit magnitude.

Another object of the invention is to provide a coded aperture array having a decoding matrix which is easily derived based on the configuration of the coded aperture array.

Still another object of the invention is to provide a coded aperture array wherein the array/detector system efficiency is relatively high, because the array has a relatively large transparent area.

BRIEF SUMMARY OF THE INVENTION

In accordance with the invention, which contemplates both an apparatus and a method, coded aperture arrays which comprise transparent and opaque elements are designed. The elements of the array are arranged so that the array is entirely interconnected and self-supporting, has a uniform signal-to-noise ratio over the entire field of view of the array which is independent of source structure, and so that the transparent elements comprise between substantially forty four percent and twenty five percent, by surface area, of the array. The elements are defined as being transparent or opaque in correspondence with an array pattern defined by the product of two pseudo-noise sequences. More particularly, the product is the direct product of the sequences. The basic array, as hereinbefore defined, is used to produce a full coded aperture array by mosaicing in two dimensions upwardly, downwardly, to the left, to the right, and in all four diagonal directions. If the basic array (and therefore the size of the detector) is $r \times s$ elements, the full array is $(2r-1) \times (2s-1)$ elements.

The pseudo-noise sequences may be of the same order, in which case the array is square, or of different orders, in which case the array is rectangular, but not square.

The array may have a continuous opaque border or may have a border that is only partially continuous. If pseudo-noise sequences having $r \times s$ elements are used to derive the basic array, then the full array will have a continuous border when the pseudo-noise sequences are cyclically expanded to have $2r-1$ and $2s-1$ elements and the first and last element in each cyclically expanded sequence is equal to zero, so that the product, also equal to zero, defines an opaque element. If the first or last element of each cyclically expanded array is other than zero, the border will be other than completely continuous.

In accordance with the invention, a coded aperture array comprises transparent and opaque elements. The coded aperture array is entirely interconnected and self-supporting. The elements of the coded aperture array are defined as being one of transparent and opaque in correspondence with an array position defined by the direct product of two pseudo-noise sequences. The direct product is defined by the relationship:

$$PNP = \begin{bmatrix} a_1b_1 & a_1b_2 & \ldots & a_1b_n \\ a_2b_1 & a_2b_2 & \ldots & a_2b_n \\ \cdot & \cdot & & \cdot \\ \cdot & \cdot & \ldots & \cdot \\ \cdot & \cdot & & \cdot \\ a_mb_1 & a_mb_2 & \ldots & a_mb_n \end{bmatrix}$$

where $a_1, a_2, \ldots, a_m =$ an $m^{th}$ order pseudo-noise sequence and $b_1, b_2, \ldots, b_n =$ an $n^{th}$ order pseudo-noise sequence.

A pattern is formed by translating the array pattern so that the array pattern is repeated to all sides and corners thereof.

If the coded aperture array is initially of $r \times s$ elements, after translating, the coded aperture array is of $(2r-1) \times (2s-1)$ elements.

The two pseudo-noise sequences may be of the same order and may be of different order.

The coded aperture array has a border which is continuous at least over a substantial portion of the border.

The coded aperture array is entirely interconnected and has a border which is other than continuous.

In accordance with the invention, a method for designing a coded aperture array having transparent and opaque elements comprises the steps of selecting a first pseudo-noise sequence, selecting a second pseudo-noise sequence and multiplying the first pseudo-noise sequence by the second pseudo-noise sequence to define a direct product thereof. The direct product is defined by the relationship:

$$PNP = \begin{bmatrix} a_1b_1 & a_1b_2 & \ldots & a_1b_n \\ a_2b_1 & a_2b_2 & \ldots & a_2b_n \\ \cdot & \cdot & & \cdot \\ \cdot & \cdot & \ldots & \cdot \\ \cdot & \cdot & & \cdot \\ a_mb_1 & a_mb_2 & \ldots & a_mb_n \end{bmatrix}$$

where $a_1, a_2, \ldots, a_m =$ an $m^{th}$ order pseudo-noise sequence and $b_1, b_2, \ldots, b_n =$ an $n^{th}$ order pseudo-noise sequence, and assigning each element in the coded aperture array to be one of transparent or opaque in correspondence with a value of the product of the first and second pseudo-noise sequences.

The method further comprises the step of translating the coded aperture array so that the array is repeated to all sides and corners thereof.

If the array is initially of $r \times s$ elements, after translation, the coded aperture array is defined to be of $(2r-1) \times (2s-1)$ elements.

The first pseudo-noise sequence is of a first length and the second pseudo-noise sequence is of a second length. The first length may be different than, or equal to, the second length.

The first pseudo-noise sequence is of r elements and the second pseudo-noise sequence is of s elements. The method further comprises the step of cyclically expanding the first pseudo-noise sequence and the second pseudo-noise sequence to define expanded pseudo-noise sequences, so that at least one of the first and last element of at least one of the first and second pseudo-noise sequences is equal to zero, whereby at least one side of the coded aperture array has a continuous border.

The method further comprises the step of selecting each of the first and second pseudo-noise sequences, so that each of the first and second pseudo-noise sequences has a first element and a last element equal to zero, whereby the coded aperture array has a continuous border about all four sides thereof.

The first pseudo-noise sequence is of r elements and the second pseudo-noise sequence is of s elements. The method further comprises the step of cyclically expanding the first pseudo-noise sequence and the second pseudo-noise sequence to define expanded pseudo-noise sequences, so that at least one of the first and last digits in one of the first pseudo-noise sequence and the second pseudo-noise sequence is a one whereby the coded aperture array has a border which is other than continuous about the perimeter thereof.

BRIEF DESCRIPTION OF THE DRAWINGS

In order that the invention may be readily carried into effect, it will now be described with reference to the accompanying drawings, wherein:

FIG. 4 is a another coded aperture array according to the invention;

FIG. 5 is yet another coded aperture array according to the invention;

FIG. 6 is a pattern used to form still another coded aperture array according to the invention;

FIG. 7 is a presentation of a typical prior art G function;

FIGS. 9A, 9B, 9C, 9D, 9E and 9F, shows the autocorrelation of the aperture function (A) and the detector response (D) for several lag positions.

DETAILED DESCRIPTION OF THE PREFERRED EMBODIMENTS

Figure 1:
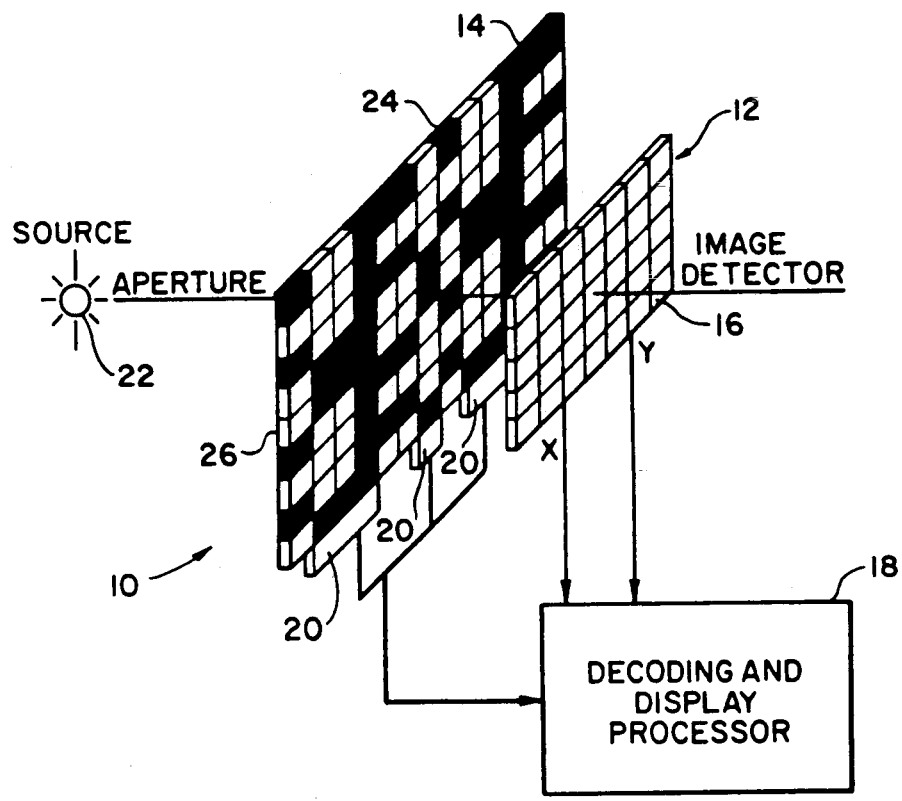
FIG. 1 is a diagrammatic view of a prior art coded aperture array imaging system.

A brief account of the mathematical model used to describe coded aperture detectors is first presented with reference to a system such as that described in FIG. 1. Terminology useful when comparing the predicted performance of an array according to the invention and that of other coded aperture arrays is developed.

The system 10 of FIG. 1 is composed of a two-dimensional, position-sensitive image detector 12 mounted parallel to, and in back of, a coded aperture array 14. Detector 12 has an intrinsic spatial resolution and therefore is conveniently represented by a matrix, each element of which contains the total number of interactions recorded on a detector resolution element 16.

Detector elements 16 are arranged in rows and columns and provide X and Y outputs to a decoding and display processor 18. Elements 16 are all of equal size and are all of equal length and width (square) in the plane of detector 12. Processor 18 may be of the type described in Edward E. Fenimore et al U.S. Pat. No(s). 4,209,780 and 4,360,797. Processor 18 may include analog to digital converters for the X and Y outputs of image detector 12, a dual parameter pulse height analyzer receiving the outputs of the analog to digital converters, a memory, a scan control system, an adding register and a display, as described in the aforementioned patents. Processor 18 also includes a computer programmed to decode the data from image detector 12.

Although not disclosed in the aforementioned patents to Fenimore, when coded aperture array 14 is made of a scintillation material, a number of veto detectors 20 may also be provided to supply veto signals to processor 18, so that photons from a source 22 which penetrate opaque portions of array 14 cause a veto signal to be applied to said processor in order to prevent the said processor from responding to the signal in an element 16 of image detector 12 produced by that photon. While only three detectors 20 have been shown for simplicity of presentation, it will be recognized that many more would be needed to acquire all necessary veto signals for array 14, wherein the opaque portions are not continuously connected.

Aperture array 14 is also represented by a matrix with elements having assigned values of either 0 or 1, depending on whether the element is an opaque (filled) element 24 (value=0) or a transparent element 26 (a hole) to the incident radiation (value=1). The physical aperture is actually derived from a "basic" pattern through the process of "internal mosaicing," as described by Fenimore and Cannon in "Coded Aperture Imaging With Uniformly Redundant Arrays", Appl. Opt., Vol. 17, 1978, page 337. Thus, the physical aperture will have approximately four times as many elements 24 and 26 as the basic pattern. All of the elements 24 and 26 are of equal size and all are of equal length and width (square) in the plane of aperture array 14.

For simplicity, it is assumed that the source 22 is entirely contained in a two-dimensional plane that is parallel to, and a fixed distance from, aperture array 14. Each detector element 16 is then capable of viewing through a given aperture element 26 or hole only a limited portion of the source plane. It is natural then to divide the source plane into discrete elements, and have $\rho_{ij}$ represent that amount of radiation emanating from the $ij^{th}$ source element which is visible through a single aperture opening. With this definition of the source matrix $\rho$, the results obtained will be consistent with previously published works, thus facilitating comparison.

It may be shown that the data D from detector 12 is described mathematically by the correlation of the distribution of source 22 with aperture array 14, or $$D = \rho * A + B \quad (1)$$

where * is the correlation operator. The last term, B, is an additional background term which includes all contributions to the detector not modulated by aperture array 14, such as cosmic-ray particles and detector dark currents. To reconstruct the image $\rho$ of source 22 from the coded data, $\hat{\rho}$ is defined; that is the reconstructed source. The decoding function G is defined by the following equation:

$$\hat{\rho} = D * G = \rho I A * G + B * G \quad (2)$$

The carat symbol ($\hat{\ }$) is used to denote that the quantity under it is only an estimate. A coded aperture array has theoretically ideal imaging properties when $\hat{\rho} = \rho$.

Now, provided $A*G$ is a Kronecker delta function, Equation 2 reduces to:

$$\hat{\rho} = \rho + B*G \quad (3)$$

and the image of the source is perfectly reconstructed from the coded data, except for the presence of a background term. It is more convenient, however, to define the decoding function to be such that the reconstructed image has an intensity proportional to the number of open areas or elements 26 in the basic aperture pattern. This serves to simplify later calculations. Thus, G is defined to satisfy the following equation:

$$A*G = N\delta_k \quad (4)$$

where N is the number of holes or openings in the basic aperture pattern and $\delta_k$ is a Kronecker delta function. Then, instead of Equation 3, it follows that:

$$\hat{\rho} = N\rho + B*G \quad (3a)$$

An important quantity that must also be considered is the signal-to-noise ratio, or SNR, in the reconstructed image. Ultimately, this will determine the sensitivity of the measurement. Generally, the SNR of a particular pixel element will be the ratio of the expected peak height of the source in that pixel to some noise term. The expected peak height (from Equation 3a) is $N\rho + B*G$, but in calculating the SNR, the last term, $B*G$, will be neglected in order to conform with the definition given by Fenimore in "Coded Aperture Imaging: Predicted Performance of Uniformly Redundant Arrays", Appl. Opt., Vol. 17, No. 22, 1978, pages 3562-70.

Thus, if $\sigma(\hat{\rho})$ represents the noise term associated with the reconstructed object, the signal-to-noise ratio in the $ij^{th}$ pixel element is given by $$SNR_{ij} = \frac{N\rho_{ij}}{\sigma(\hat{\rho}_{ij})} \quad (5)$$

There are several ways to define the noise term. The approach developed by Fenimore, supra, in deriving an expression for his URA is followed. Thus, considering three contributions to the SNR noise term, $$\sigma(\hat{\rho}_{ij}) = \sqrt{VAR(\hat{\rho}_{ij}, \rho_{ij}) + \sum_{kl} VAR(\hat{\rho}_{kl}, \rho_{ij}) + Var(B, \hat{\rho}_{ij})} \quad (6)$$

where VAR($\rho_{ij},\hat{\rho}_{ij}$) is the variance of the contribution of the $ij^{th}$ source-point to the reconstructed point, $$\sum_{kl} VAR(\rho_{kl}, \hat{\rho}_{ij})$$

is the variance due to all the source elements within the field of view, and VAR($B,\hat{\rho}_{ij}$) is the variance due to background.

Using Equation 2 and the property of the correlation operator, it is possible to show that the three contributions may be calculated (assuming Poisson statistics for the measurement) as:

$$VAR(\rho_{ij}, \hat{\rho}_{ij}) = \rho_{ij} \sum_{kl} A_{kl} G_{kl}^2 \tag{6a}$$

$$\sum_{kl} VAR(\rho_{kl}, \hat{\rho}_{ij}) = (\rho^*A^*G^2)_{ij} \tag{6b}$$

$$VAR(B, \hat{\rho}_{ij}) = (B^*G^2)_{ij} \tag{6c}$$

where $G^2$ is a matrix obtained from G by squaring each one of its elements.

Since these equations make no assumption about the particular aperture pattern, they are general expressions which apply to all aperture designs.

It is noted that the multiplexing process introduces a signal cross-talk term given by Equation 6b. This means that, when calculating the signal-to-noise ratio for a particular pixel element, say $SNR_{ij}$, sources other than $\rho_{ij}$ will contribute to the noise term. Furthermore, each contribution will be weighted by the square of a decoding coefficient. Thus, unless all coefficients are of equal magnitude, $SNR_{ij}$ will depend on the location of the other contributing sources. It is therefore desirable that the decoding array G be constructed in such a way that every element be given the same magnitude, for then the SNR will be uniform and independent of the geometry of the source. As hereinbefore noted, pseudo-noise arrays have been shown to possess this very feature and have high throughput.

Pseudo-random or pseudo-noise (PN) sequences are well known in communications theory. The ten shortest such sequences are hereinafter defined for various values of n, the number of digits in the sequence:

| n = 3 | 101 |
|---|---|
| n = 7 | 1110100 |
| n = 11 | 11011 10001 0 |
| n = 15 | 00010 01101 01111 |
| n = 19 | 11001 11101 01000 0110 |
| n = 23 | 11111 01011 00110 01010 000 |
| n = 31 | 00001 00101 10011 11100 01101 11010 1 |
| n = 35 | 00100 11010 10000 10011 10111 11000 11101 |
| n = 43 | 11001 01001 11011 11100 01011 10000 01000 11010 110 |
| n = 47 | 11111 01111 00101 01110 01001 10110 00101 01100 00100 00 |

In accordance with the present invention, two-dimensional arrays are constructed from one-dimensional PN sequences. Let $a_1, a_2, \ldots, a_m$ be an $m^{th}$ order PN sequence, and $b_1, b_2, \ldots, b_n$ an $n^{th}$ order PN sequence. The new array, formed from two, rather than one, PN sequence, will be referred to as a PNP array (for Pseudo-Noise Product) and is constructed by taking the direct product of the two PN sequences:

$$PNP = \begin{bmatrix} a_1b_1 & a_1b_2 & \cdots & a_1b_n \\ a_2b_1 & a_2b_2 & \cdots & a_2b_n \\ \cdot & \cdot & & \cdot \\ \cdot & \cdot & & \cdot \\ \cdot & \cdot & & \cdot \\ a_mb_1 & a_mb_2 & \cdots & a_mb_n \end{bmatrix} \tag{7}$$

It is noted that a PNP array may be constructed by starting a PN sequence used to construct the array at any point along the sequence, continuing until the end of the sequence, and then continuing from the beginning of the sequence until a sequence of n digits has been constructed. In other words, if the sequence for n=3 is being used, it can be represented as 101, 011 or 110; that is, the sequence can be started with the first, second, or third (that is, any) digit therein used as the starting point. In addition, the PN sequences can be used in reverse; that is, one can start at any point and go back cyclically in a direction opposite that shown above.

Figure 2:
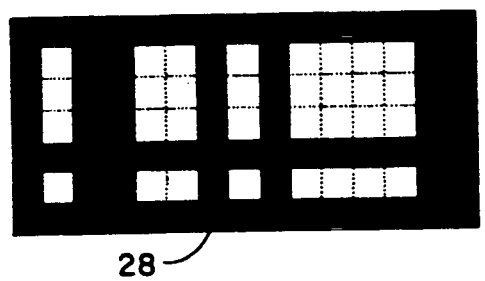
FIG. 2 is a coded aperture array according to the invention.
Figure 3:
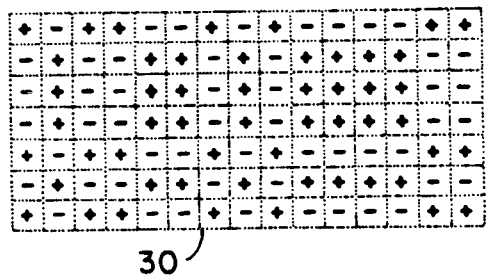
FIG. 3 is a decoding matrix used to decode data produced by a detector operating with the coded aperture array of FIG. 2.

By virtue of their construction, PNP arrays may be implemented in any dimensions for which PN sequences exist. Since each of the one-dimensional PN sequences has approximately fifty percent "open area," the PNP array will have roughly half that, or twenty five percent open area. For example, using a 7-element and a 15-element PN sequence, a 7×15 PNP array "basic" aperture pattern shown in FIG. 2 is generated. As in FIG. 1, black areas represent opaque regions, while white areas represent holes. FIG. 3 illustrates the decoding matrix 30 for the pattern of FIG. 2, wherein + represents +1, and − represents −1.

Two PNP aperture configurations showing square and rectangular designs are illustrated in FIG. 4 and FIG. 5, respectively. The square design 32 (FIG. 4) is built from a basic 11×11 pattern, and the rectangular design 34 (FIG. 5) from a basic 15×7 pattern. The basic pattern forms the central portion of the aperture. Mosaicing is accomplished by translating the basic pattern to all sides and corners. The total overall dimension is (2r−1) by (2s−1).

An example of a pattern 36 used to construct a coded aperture array which may be used with a 3×7 element detector is illustrated in FIG. 6. The basic 3×7 pattern 38 is derived by taking the direct product of the PN sequences for n=3 and n=7 in accordance with Equation 7. That is $a = 101$ $b = 1110100$ Mosaicing of basic pattern 38 to form pattern 36 is accomplished by translating basic pattern 38 up, down to the right, to the left and in the four diagonal directions. However, only parts of the translated basic pattern are used. As hereinbefore noted, if the basic array has r×s elements, the full array has (2r−1)×(2s−1) elements while the detector has r×s elements. Since basic pattern 38 is a 3×7 pattern, the full coded aperture array constructed in accordance with full pattern 36 is a 5×13 element array.

Since the zeros in the array represents opaque areas, it is clear that most of the border of an array in accordance with pattern 36; that is, most of the elements making up the periphery or the circumference thereof, are transparent. Thus, although array 36 is self-supporting and totally interconnected, the border is not solid; that is, there is no continuous frame around the border, which may be advantageous for structural reasons in certain applications.

A simple technique for mosaicing a basic array is to write a first pseudo-noise sequence having r elements from which the array is derived over and over again cyclically along the horizontal direction of a grid until more than 2r−1 elements, for example, 3r elements, have been written. A second pseudo-noise sequence having s elements is then written over and over again along the vertical direction of the grid until more than 2s−1 elements, for example 3s elements, have been written. The product of the digits along the horizontal and vertical edges are then written into the spaces defined by the grid at the intersection of the rows and columns of the grid. Any (2r−1)×(2s−1) array may be selected from the grid.

By using this technique, it may be seen that an array according to the invention having a solid (opaque) border may be produced by taking the product of two pseudo-noise sequences wherein the basic array has r×s elements and the full array has (2r−1)×(2s−1) elements if the 2r−1 and 2s−1 element sequences both begin and end with zeros. Then, the product of the digits around the entire border will be equal to zero (opaque) and the border will be continuous.

If one of the sequences starts with a one, rather than a zero, the border will not be continuous about the entire periphery thereof, but the array will be a kind having a partially open border, as is the case for an array according to FIG. 6. It will be understood that a totally continuous border is not possible for an array derived from the product of the pseudo-noise sequence wherein n=3 because the sequence itself and its cyclical repetition never have two zeros in a row.

If it is desired that less than all four sides of the border of the array be continuous, this can be accomplished by selecting the cyclically expanded pseudo-noise sequences so that only selected ones of the first and last digit of each sequence is equal to zero. Thus, for example, to have a continuous top border, the first digit of the sequence selected from digits along the vertical edge of the grid must be zero. To have a continuous bottom border, the last element of said sequence must be equal to zero. To have a continuous "left" border, the first element of the pseudo-noise sequence selected from digits along the top of the grid must be zero. To have a continuous "right" border, the last element of said sequence must be zero.

It is of importance that the PNP array may be constructed as a self-supporting, interconnecting structure. By this it is meant that all opaque areas are interconnected in such a manner as to give physical support to the overall structure. Such structures are relatively inexpensive to manufacture, as it is only necessary to remove material at selected locations from a plate or slab. There are no portions that must be independently supported at physically isolated positions with respect to one another. This self-connecting design translates into a simplified read-out scheme that eliminates the requirement for complicated light pipe configurations. Thus, for example, by placing photodiodes or photomultiplier tubes along the aperture periphery, an active aperture may easily be implemented.

Another important aspect of a PNP array is the decoding matrix. As shown in FIG. 3, all decoding coefficients of matrix 30 are of unit magnitude. This is true for all PNP arrays, regardless of size. The virtue of this property has already been discussed. It is important to note that the PNP array is the only self-supporting array having this property. Closer examination of the PNP array and its decoding matrix reveals that an intimate relationship exists between the aperture and its decoding function. A simple prescription for generating the decoding function from the aperture pattern may be stated as follows:

(a) For every corresponding column, or row, in A not consisting entirely of zeros, set $G_{ij}=1$ if $A_{ij}=1$, and $G_{ij}=-1$ if $A_{ij}=0$. It is noted that all columns, or rows, in the decoding matrix which are determined in this step will be identical.

(b) All remaining unassigned columns, or rows, are set equal in magnitude, but opposite in sign.

By virtue of the unit magnitude decoding coefficients and the fact that G is an exact correlation inverse of A, the PNP aperture will provide perfect imaging, that is, no artifacts, with an SNR that is independent of the original source structure.

A self-supporting coded aperture array is described by Edward E. Fenimore in U.S. Pat. No. 4,389,633. However, the Fenimore design is different from the PNP in a number of important ways, three of which are hereinafter explained. Since the present PNP application discusses the mathematical algorithms used to generate the PNP aperture, instead of the differences of Fenimore in mathematical structure, the consequences of the difference in designs are hereinafter discussed.

The PNP aperture has twice the throughput of the self-supporting URA. This can be seen by reference to the Fenimore U.S. Pat. No. 4,389,633, which shows that the self-supporting URA has a fractional open area of approximately ¼. (Col. 4, line 61 through Col. 5, line 10 of the Fenimore patent.) The PNP however, has a total throughput of ½, which means that twice as much signal will reach the detector plane, and therefore the PNP aperture will have twice the sensitivity, or signal-to-noise ratio, as the self-supporting URA.

Figure 9:
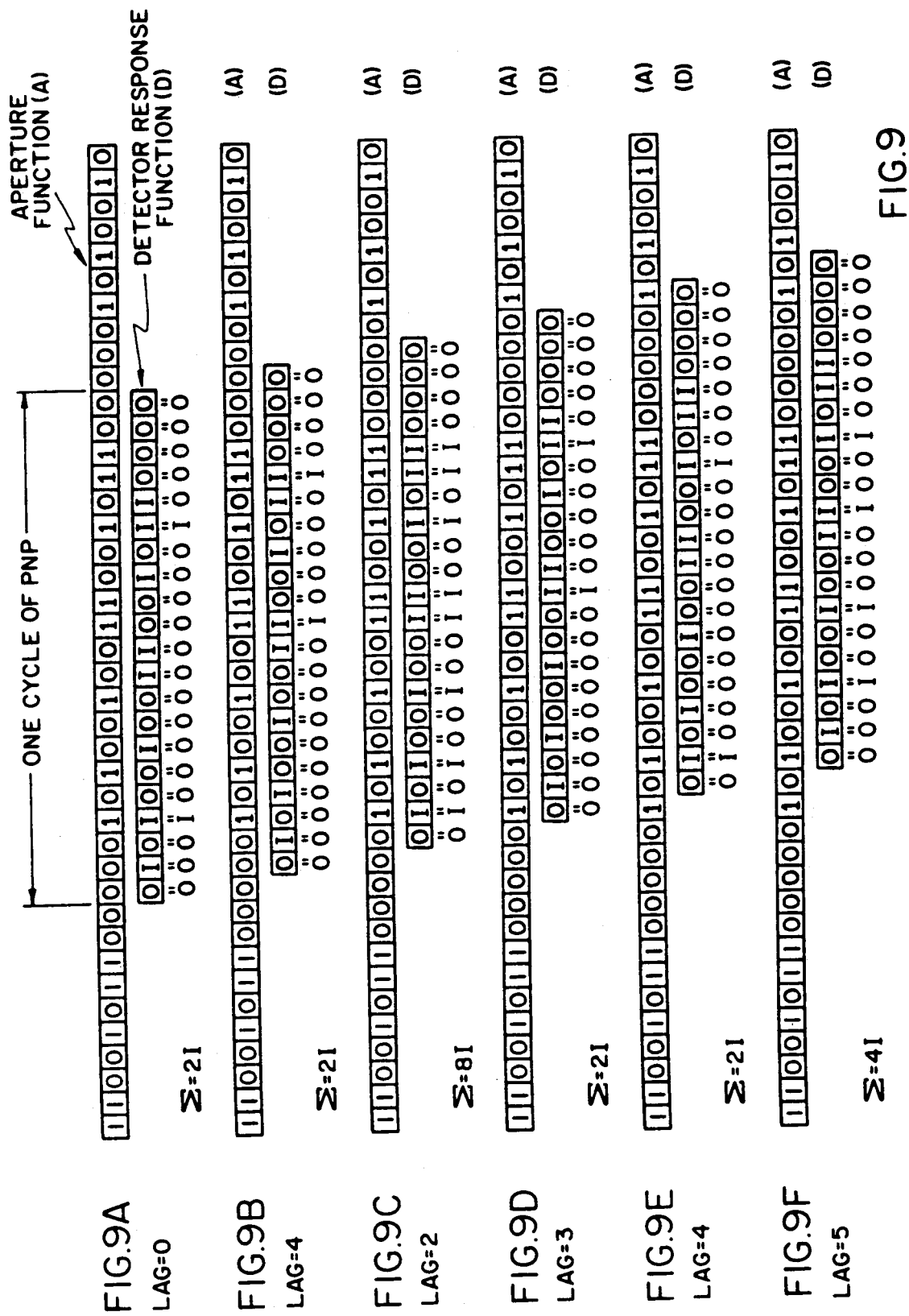
FIG. 9, which includes

The balance correlation function (G) is the mathematical function used to decode the recorded data in order to form an image. In the Fenimore U.S. Pat. No. 4,389,633, Col. 2, lines 60–65, this function is represented by a value of +1 corresponding to holes in the aperture, −1 for non-holes, and 0 for the supporting surface area. FIG. 9 of said Fenimore patent shows a typical G function, reproduced as FIG. 7 of the present application. It should be noted that this function is made up mostly of 0's (75%), while the remaining 25% consists of +1's and −1's. This is markedly different from the PNP G function, which has only +1's and −1's, and no 0's. An example of the PNP G function is provided in FIG. 3.

It is important to note the difference between Fenimore's G function and the PNP's. As has been hereinbefore explained, unless all the decoding coefficients (G function elements) are of equal magnitude, the signal-to-noise ratio (SNR) depends on the location of other contributing sources. It is therefore desirable that the decoding array G be constructed in such a way that every element be given the same magnitude, since then the SNR will be uniform and independent of the geometry of the source. PNP arrays possess this feature, but Fenimore's self-supporting arrays do not, since they contain three values (+1, 0, −1).

The autocorrelation response function is very different for the PNP, which is another indication that the aperture code of applicants is different from that of Fenimore.

Figure 8:
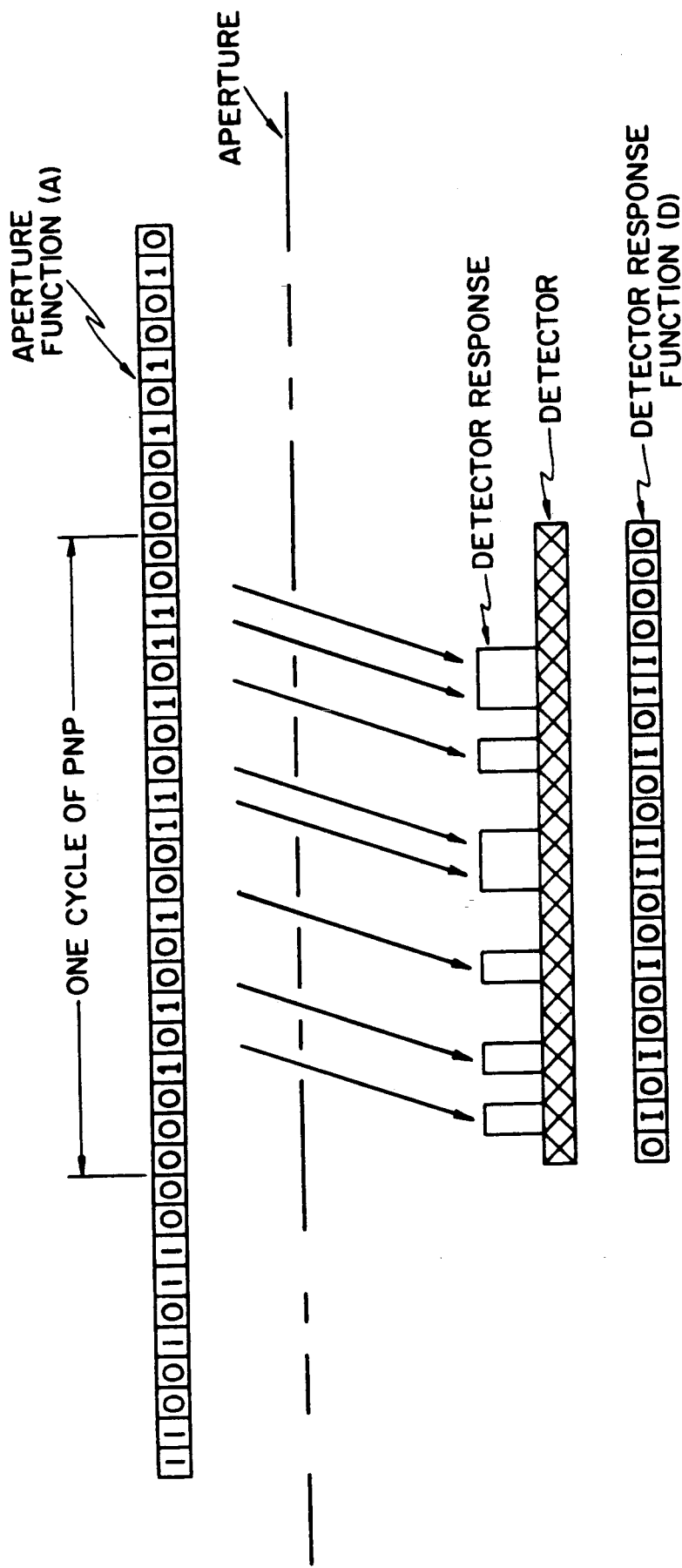
FIG. 8 is a schematic diagram of a one-dimensional PNP.

FIG. 8 is a schematic representation of a one-dimensional PNP. In two-dimensions, it would be self-supporting. The ideal detector response is also shown in FIG. 8 for a point source displaced two units to the right of the center line.

FIG. 9 shows the autocorrelation of the aperture function (A) and the detector response (D) for several lag positions. In each of FIGS. 9A, 9B, 9D and 9E, $\Sigma = 2I$. In FIG. 9C, $\Sigma = 8I$. In FIG. 9F, $\Sigma = 4I$. In FIG. 9A, the lag is 0. In FIG. 9B, the lag is 1. In FIG. 9C, the lag is 2. IN FIG. 9D, the lag is 3. In FIG. 9E, the lag is 4. In FIG. 9F, the lag is 5.

Figure 10:
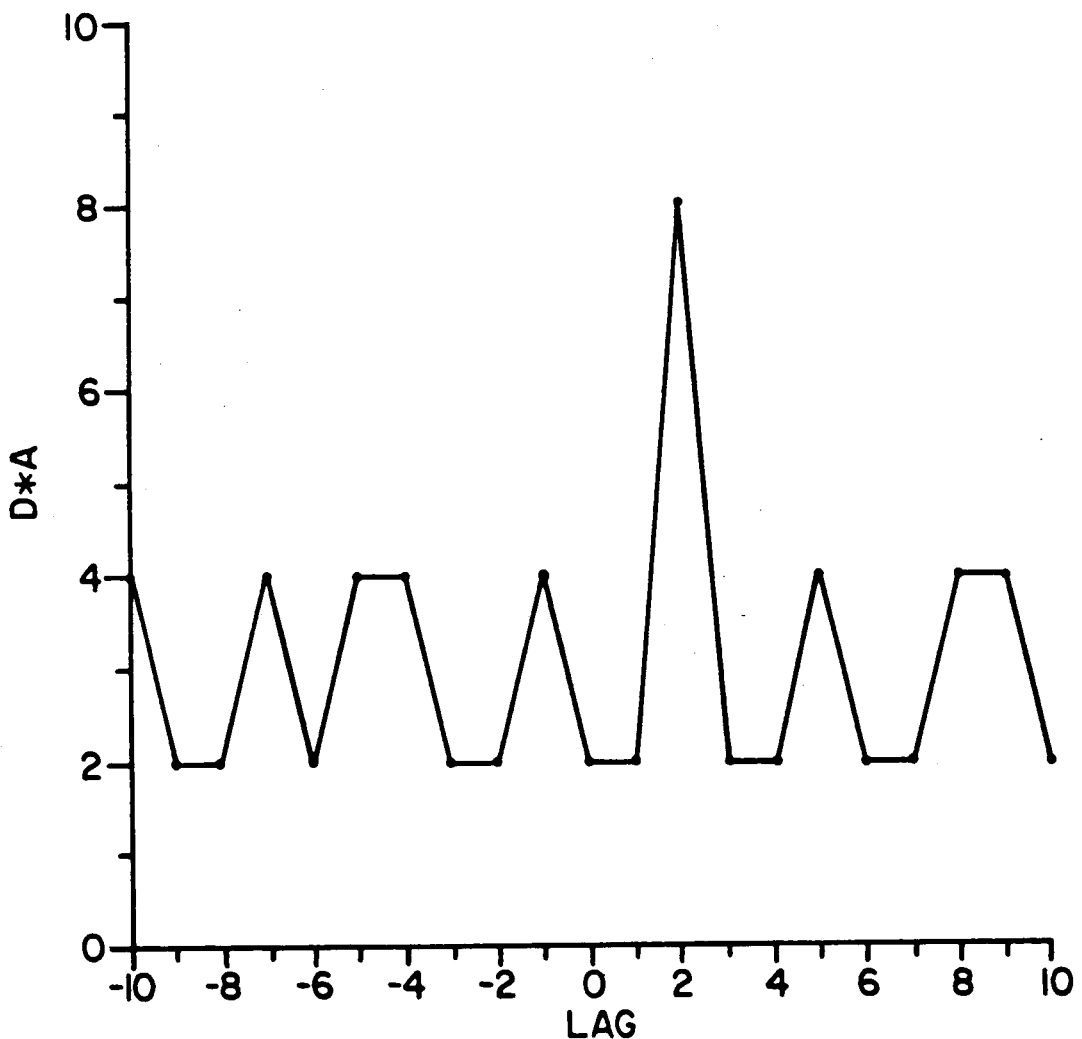
FIG. 10 shows the autocorrelation response function (D*A).

FIG. 10 shows the autocorrelation response function (D*A) produced in FIG. 9. In FIG. 10, the abscissa indicates the lag and the ordinate represents the autocorrelation response function (D*A). This should be compared with the one obtained by Fenimore for his self-supporting URA, as disclosed in U.S. Pat. No. 4,389,633. This is for a 21 element PNP. These two functions are distinctly different and illustrate the fact that the two apertures behave differently.

It will be understood by one skilled in the art that in practice the rear and periphery of the detector and aperture array are surrounded by a shielding enclosure, so that only radiation passing through the aperture array reaches the detector.

In summary, the present invention is directed to a new class of coded aperture arrays called PNP arrays (for Pseudo-Noise Products) which are derived as direct products of two PN sequences and have approximately twenty five percent fractional open area. PNP arrays can be of either square or rectangular geometry. All PNP apertures may be of self-supporting design, and are thus ideal candidates for situations where active apertures are employed, such as, for example, in high-energy γ-ray imaging.

A unique and important feature of all PNP arrays is the ability to produce reconstructed images having noise which is uniform regardless of the original source structure. This result follows directly from the structure of the decoding function. The PNP decoding coefficients are always of unit magnitude.

In addition to having the aforementioned describable properties, PNP arrays have relatively high throughput. Since every PN sequence has one more "1" than zeros, it can be shown that the fractional open or transparent area of the basic array is $$FOA = \frac{\left(\frac{r+1}{2}\right)\left(\frac{s+1}{2}\right)}{rs}$$

If r and s are both equal to 3 (the first PN sequence) then the open area is 44.4%. However, as r and s increase in magnitude, that is, the number of elements in the array increases, the open area of the basic array drops to 25%.

Finally, it has been demonstrated that the SNR obtained with the PNP aperture is insensitive to source structure.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. A coded aperture array comprising transparent and opaque elements, said coded aperture array being entirely interconnected and self-supporting, the elements of said coded aperture array being defined as being one of transparent and opaque in correspondence with an array pattern defined by the direct product of two pseudo-noise sequences, said direct product being defined by the relationship $$PNP = \begin{bmatrix} a_1b_1 & a_1b_2 & \ldots & a_1b_n \\ a_2b_1 & a_2b_2 & \ldots & a_2b_n \\ \cdot & \cdot & & \cdot \\ \cdot & \cdot & \ldots & \cdot \\ \cdot & \cdot & & \cdot \\ a_mb_1 & a_mb_2 & \ldots & a_mb_n \end{bmatrix}$$

where $a_1, a_2, \ldots, a_m =$ an $m^{th}$ order pseudo-noise sequence and $b_1, b_2, \ldots, b_n =$ an $n^{th}$ order pseudo-noise sequence.

2. The coded aperture array of claim 1, wherein if said coded aperture array is initially of $r \times s$ elements, after translating, said coded aperture array is of $(2r-1) \times (2s-1)$ elements.

3. The coded aperture array of claim 1, wherein said two pseudo-noise sequences are of the same order.

4. The coded aperture array of claim 1, wherein said coded aperture array has a border which is continuous at least over a substantial portion of the border.

5. The coded aperture array of claim 1, wherein said coded aperture array is entirely interconnected and has a border which is other than continuous.

6. A method for designing a coded aperture array having transparent and opaque elements, comprising the steps of selecting a first pseudo-noise sequence;
selecting a second pseudo-noise sequence;
multiplying said first pseudo-noise sequence by said second pseudo-noise sequence to define a direct product thereof, said direct product being defined by the relationship $$PNP = \begin{bmatrix} a_1b_1 & a_1b_2 & \ldots & a_1b_n \\ a_2b_1 & a_2b_2 & \ldots & a_2b_n \\ \cdot & \cdot & & \cdot \\ \cdot & \cdot & \ldots & \cdot \\ \cdot & \cdot & & \cdot \\ a_mb_1 & a_mb_2 & \ldots & a_mb_n \end{bmatrix}$$

where $a_1, a_2, \ldots, a_m =$ an $m^{th}$ order pseudo-noise sequence and $b_1, b_2, \ldots, b_n =$ an $n^{th}$ order pseudo-noise sequence; and assigning each element in said coded aperture array to be one of transparent or opaque in correspondence with a value of said product of said first and second pseudo-noise sequences.

7. The method of claim 6, further comprising the step of translating said coded aperture array so that said array is repeated to all sides and corners thereof.

8. The method of claim 7, wherein if said array is initially of $r \times s$ elements, after translation, said coded aperture array is defined to be of $(2r-1) \times (2s-1)$ elements.

9. The method of claim 6, wherein said first pseudo-noise sequence is of a first length and said second pseudo-noise sequence is of a second length, said first length being different than said second length.

10. The method of claim 6, wherein said first pseudo-noise sequence is of a first length and said second pseudo-noise sequence is of a second length, said first length being equal to said second length.

11. The method of claim 6, wherein said first pseudo-noise sequence is of r elements and said second pseudo-noise sequence is of s elements, said method further comprising the step of cyclically expanding said first pseudo-noise sequence and said second pseudo-noise sequence to define expanded pseudo-noise sequences, so that at least one of the first and last element of at least one of said first and second pseudo-noise sequences is equal to zero whereby at least one side of said coded aperture array has a continuous border.

12. The method of claim 11, further comprising the step of selecting each of said first and second pseudo-noise sequence, so that each of said first and second pseudo-noise sequences has a first element and a last element equal to zero, whereby said coded aperture array has a continuous border about all four sides thereof.

13. The method of claim 6, wherein said first pseudo-noise sequence is of r elements and said second pseudo-noise sequence is of s elements, said method further comprising the step of cyclically expanding said first pseudo-noise sequence and said second pseudo-noise sequence to define expanded pseudo-noise sequences, so that at least one of the first and last digits in one of said first pseudo-noise sequence and said second pseudo-noise sequence is a one, whereby said coded aperture array has a border which is other than continuous about the perimeter thereof.

* * * * *